US012801930B2

(12) United States Patent
Cintas et al.

(10) Patent No.: US 12,801,930 B2
(45) Date of Patent: Nov. 17, 2026

(54) CREATIVITY METRICS AND GENERATIVE MODELS SAMPLING

(71) Applicant: International Business Machines Corporation, Armonk, NY (US)

(72) Inventors: Celia Cintas, Nairobi (KE); Payel Das, Yorktown Heights, NY (US); Brian Leo Quanz, Yorktown Heights, NY (US); Skyler Speakman, Nairobi (KE); Victor Abayomi Akinwande, Karen (KE)

(73) Assignee: International Business Machines Corporation, Armonk, NY (US)

( * ) Notice: Subject to any disclaimer, the term of this patent is extended or adjusted under 35 U.S.C. 154(b) by 1344 days.

(21) Appl. No.: 17/535,558

(22) Filed: Nov. 24, 2021

(65) Prior Publication Data

US 2023/0162042 A1 May 25, 2023

(51) Int. Cl.
*G06N 3/08* (2023.01)
*G06N 3/04* (2023.01)
*G06N 3/045* (2023.01)
*G06N 3/088* (2023.01)

(52) U.S. Cl.
CPC ............. *G06N 3/088* (2013.01); *G06N 3/045* (2023.01)

(58) Field of Classification Search
CPC ...... G06N 3/088; G06N 3/045; G06N 3/0455; G06N 3/0475; G06N 3/098; G06N 7/01; G06N 3/047
See application file for complete search history.

(56) References Cited

U.S. PATENT DOCUMENTS

| | | | | |
|---|---|---|---|---|
| 2011/0119040 A1* | 5/2011 | Mclennan | ............... | G06F 17/18 703/2 |
| 2014/0156379 A1* | 6/2014 | Pani | ................... | G06Q 30/0242 705/14.41 |
| 2018/0336439 A1* | 11/2018 | Kliger | .................... | G06N 3/088 |
| 2019/0266438 A1* | 8/2019 | Sun | ........................... | G06T 5/77 |
| 2020/0158659 A1* | 5/2020 | Wong | ................... | H04N 13/254 |

(Continued)

OTHER PUBLICATIONS

Cherti, Out-of-Class Novelty Generation: An Experimental Foundation. 2017 International Conference on Tools with Artificial Intelligence. pp. 8.

(Continued)

*Primary Examiner* — Cesar B Paula
*Assistant Examiner* — Zelalem Shalu
(74) *Attorney, Agent, or Firm* — CHIP LAW GROUP

(57) ABSTRACT

A gaussian distribution is initialized with random parameters for each of creative scores, non-creative scores, and normal scores. The random parameters are updated to maximize a likelihood of each sample score from a training set being from its corresponding gaussian distribution by using one or more gaussian mixture models with expectation maximization to cluster the creative scores, the non-creative scores, and the normal scores. A creativity score is estimated for each of a plurality of given samples as a probability of the corresponding given sample being in a creative cluster given one or more of the random parameters of a corresponding gaussian distribution. One or more of the plurality of samples are filtered based on the creativity scores to generate a set of optimal samples.

21 Claims, 9 Drawing Sheets

(56) References Cited

U.S. PATENT DOCUMENTS

| | | | | |
|---|---|---|---|---|
| 2020/0218931 | A1 * | 7/2020 | Karlinsky | G06V 10/764 |
| 2020/0320402 | A1 | 10/2020 | Yoon | |

OTHER PUBLICATIONS

Das et al. Toward a neuro-inspired creative decoder. In Christian Bessiere (ed.), Proceedings of the Twenty-Ninth International Joint Conference on Artificial Intelligence, IJCAI-20, pp. 2746-2753. International Joint Conferences on Artificial Intelligence Organization, Jul. 2020. Main track.

Celia Cintas, Towards Creativity Characterization of Generative Models Via Group-Based Subset Scanning. Proceedings of the Thirty-First International Joint Conference on Artificial Intelligence (IJCAI-22). pp. 7.

Robert H. Berk and Douglas H. Jones. Goodness-of-fit test statistics that dominate the Kolmogorov statistics. Zeitschrift fur Wahrscheinlichkeitstheorie und Verwandte Gebiete, 47:47-59, 1979.

* cited by examiner

| Space | Dataset | Subset Scanning | | |
|---|---|---|---|---|
| | | 50% | 10% | Indv. |
| Pixel Space | First Dataset | 0.971 | 0.791 | 0.255 |
| Activation Space | First Dataset | 0.991 | 0.972 | 0.531 |
| Pixel Space | Second Dataset | 0.952 | 0.743 | 0.381 |
| Activation Space | Second Dataset | 0.990 | 0.962 | 0.596 |

CREATIVITY METRICS AND GENERATIVE MODELS SAMPLING

BACKGROUND

The present invention relates to the electrical, electronic and computer arts, and more specifically, to creativity metrics systems.

Creativity is a process that provides novel and meaningful ideas. Current deep learning approaches open a new direction, enabling the study of creativity from a knowledge acquisition perspective. Novelty generation using powerful deep generative models, such as Variational Autoencoders (VAEs) and Generative Adversarial Networks (GANs), has been attempted. Such models, however, discourage out-of-distribution generation to avoid instability and decrease spurious sample generation, limiting their creative generation potential. Novelty of the generated samples is often used as a proxy for human perception of creativity in those studies. Therefore, earlier studies mostly focused on estimating the novelty of generated samples, without explicitly considering the creativity aspect of human perception. Further, those novelty measures do not connect with the generative model features in a quantitative manner, which can provide explanation of the creative generation process.

There are multiple surrogate metrics for novelty in the literature; however, the ultimate test of creativity is done by human inspection. Human labeling has been used to evaluate deep generative models or as a part of the generative pipeline. Although human judgement of creativity has numerous drawbacks, such as manual annotation (which is not feasible for large datasets due to its labor-intensive nature), operator fatigue, and intra/inter-observer variations related to subjectivity, it is still crucial to check how humans perceive and judge generated artifacts.

SUMMARY

Principles of the invention provide techniques for generating creativity metrics. In one aspect, an exemplary method includes the operations of initializing, using at least one processor, a gaussian distribution with random parameters for each of creative scores, non-creative scores, and normal scores; updating, using the at least one processor, the random parameters to maximize a likelihood of each sample score from a training set being from its corresponding gaussian distribution by using one or more gaussian mixture models with expectation maximization to cluster the creative scores, the non-creative scores, and the normal scores; estimating, using the at least one processor, a creativity score for each of a plurality of given samples as a probability of the corresponding given sample being in a creative cluster given one or more of the random parameters of the corresponding gaussian distribution; and filtering, using the at least one processor, one or more of the plurality of samples based on the creativity scores to generate a set of optimal samples exhibiting creativity.

In one aspect, an apparatus comprises a memory and at least one processor, coupled to the memory, and operative to perform operations comprising initializing a gaussian distribution with random parameters for each of creative scores, non-creative scores, and normal scores; updating the random parameters to maximize a likelihood of each sample score from a training set being from its corresponding gaussian distribution by using one or more gaussian mixture models with expectation maximization to cluster the creative scores, the non-creative scores, and the normal scores; estimating a creativity score for each of a plurality of given samples as a probability of the corresponding given sample being in a creative cluster given one or more of the random parameters of the corresponding gaussian distribution; and filtering one or more of the plurality of samples based on the creativity scores to generate a set of optimal samples exhibiting creativity.

In one aspect, a computer program product for federated learning, the computer program product comprising a computer readable storage medium having program instructions embodied therewith, the program instructions executable by a computer to cause the computer to perform operations comprising initializing a gaussian distribution with random parameters for each of creative scores, non-creative scores, and normal scores; updating the random parameters to maximize a likelihood of each sample score from a training set being from its corresponding gaussian distribution by using one or more gaussian mixture models with expectation maximization to cluster the creative scores, the non-creative scores, and the normal scores; estimating a creativity score for each of a plurality of given samples as a probability of the corresponding given sample being in a creative cluster given one or more of the random parameters of the corresponding gaussian distribution; and filtering one or more of the plurality of samples based on the creativity scores to generate a set of optimal samples exhibiting creativity.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

- a creativity score defined based on a distance metric between subset scores distribution in the activation space across a set of samples;
- gaussian mixture models used with expectation maximization to cluster the scores (the creativity score is then estimated for a new sample as the probability of it being in the creative cluster given the parameters of its gaussian distribution);

- a soft-labeling process for creative and not-creative samples;
- a sampling method for extracting only creative samples from the generative process;
- increased accuracy of and improved creative samples attained by filtering out non-creative samples and retaining the creative samples;
- reduced storage usage attained by eliminating non-creative samples; and
- improved operating performance of downstream tasks by eliminating non-creative samples.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

DETAILED DESCRIPTION

Figure 1:
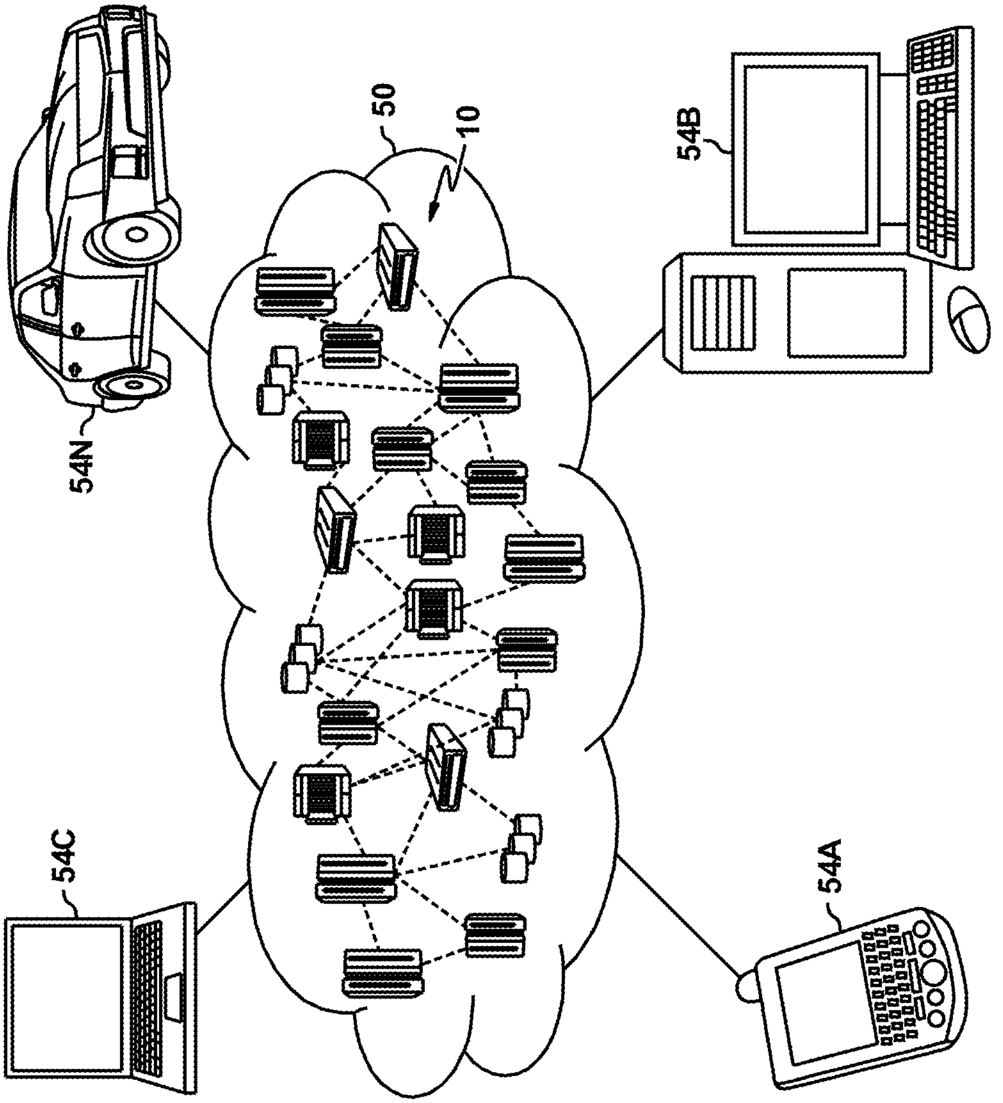
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

- Private cloud: the cloud infrastructure is operated solely for an organization. It may be managed by the organization or a third party and may exist on-premises or off-premises.
- Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
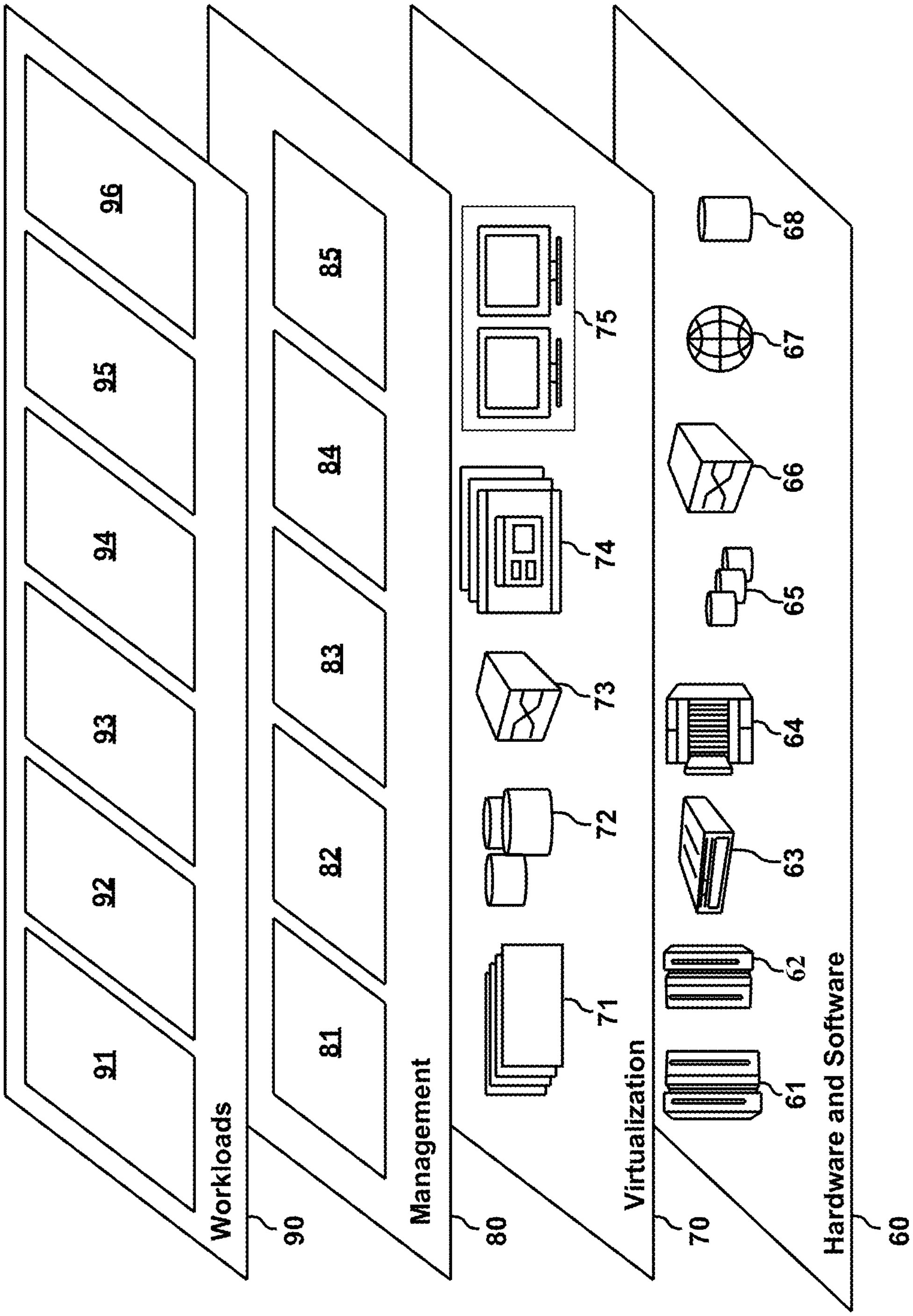
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a creativity metrics component 96. For example, the estimation of the metric and sampling of the generated examples can be computed on a cloud-based service.

Deep generative models, such as Variational Autoencoders (VAEs), have been widely employed in computational creativity research. Such models, however, discourage out-of-distribution generation to avoid spurious sample generation, limiting their creativity. Thus, incorporating research on human creativity into generative deep learning techniques presents an opportunity to make their outputs more compelling and human-like. As the emergence of generative models directed to creativity research continues, a need for machine learning-based surrogate metrics to characterize creative output from these models is imperative.

Indeed, the design of creativity evaluation schemes is as essential as developing creative generative methods. One or more embodiments advantageously provide techniques that allow multiple aspects of creativity to be better defined, to allow the research community to develop and test hypotheses systematically.

Generally, systems and methods for group-based subset scanning to quantify, detect, and characterize creative processes are disclosed. In one example embodiment, this is accomplished by detecting a subset of anomalous node-activations in the hidden layers of generative models. Experiments on original, typically decoded, and creatively decoded image datasets reveal that the proposed subset scores distribution is more useful for detecting creative processes in the activation space rather than the pixel space. Further, it was discovered that creative samples generate larger subsets of anomalies than normal or non-creative samples across datasets. The node activations highlighted during the creative decoding process are different from those responsible for normal sample generation.

In one example embodiment, a method and system determines if a given generative process will produce a creative sample by employing a creative distance metric based on score distributions in the activation space. The exemplary technique is applied at the activation space of generative models (e.g., creative decoders). A machine learning (ML) model is trained to measure a set of activations in a given layer and samples from a decoder, and then a distance metric based on the creative scores is applied to intelligently select the samples that have the higher probability of being creative. In other words, a determination is made if a given generation process will create a sample that can be characterized as creative or novel by employing creative scores distribution.

In one example embodiment, a metric and sampling system provides the end-user information regarding which samples are the most creative and least creative. An off-the-shelf generative model can be processed, and a creative score can be generated for a given forward pass over the Creative Decoder Network (CDN). This score helps to characterize if the sample generated from the latent space is creative, non-creative or normal. Furthermore, the user is provided with the subset of anomalous nodes and subset scanning scores to improve the explainability capability of an innovative distance metric generated score of current VAEs. Methods for inspecting and visualizing the set of nodes that make a sample creative and non-creative are provided.

In one example embodiment, a method detects and characterizes when the generative model produces a creative artifact as per a human evaluator. Group-based scanning is employed to determine whether a given batch of generated processes contains creative samples using an anomalous pattern detection method called group-based subset scanning.

In one example embodiment, the distribution of the activation space of the generative model is analyzed under normal samples.

In one example embodiment, the creative throughput of the given model per batch is estimated, and this parameter is used to tune the subset scores distributions.

In one example embodiment, the distributions of subset scores for creative, and non-creative processes are estimated under known labeled data, and these are used to build a creative score by multiple Gaussian Distributions.

In one example embodiment, the distribution of the activation space of the Generative Model is analyzed. After the activations are extracted from the model for a set of latent vectors 1, the empirical p-values are computed, followed by the maximization of non-parametric scan statistics (NPSS). Finally, distributions of subset scores for creative and non-creative processes are estimated, and a subset of samples and the corresponding anomalous subset of nodes in the network are used to build a creative score by multiple Gaussian Distributions. If the activations are not scored under $\theta_c$, the sample is discarded and not shown to the end-user.

Figure 3:
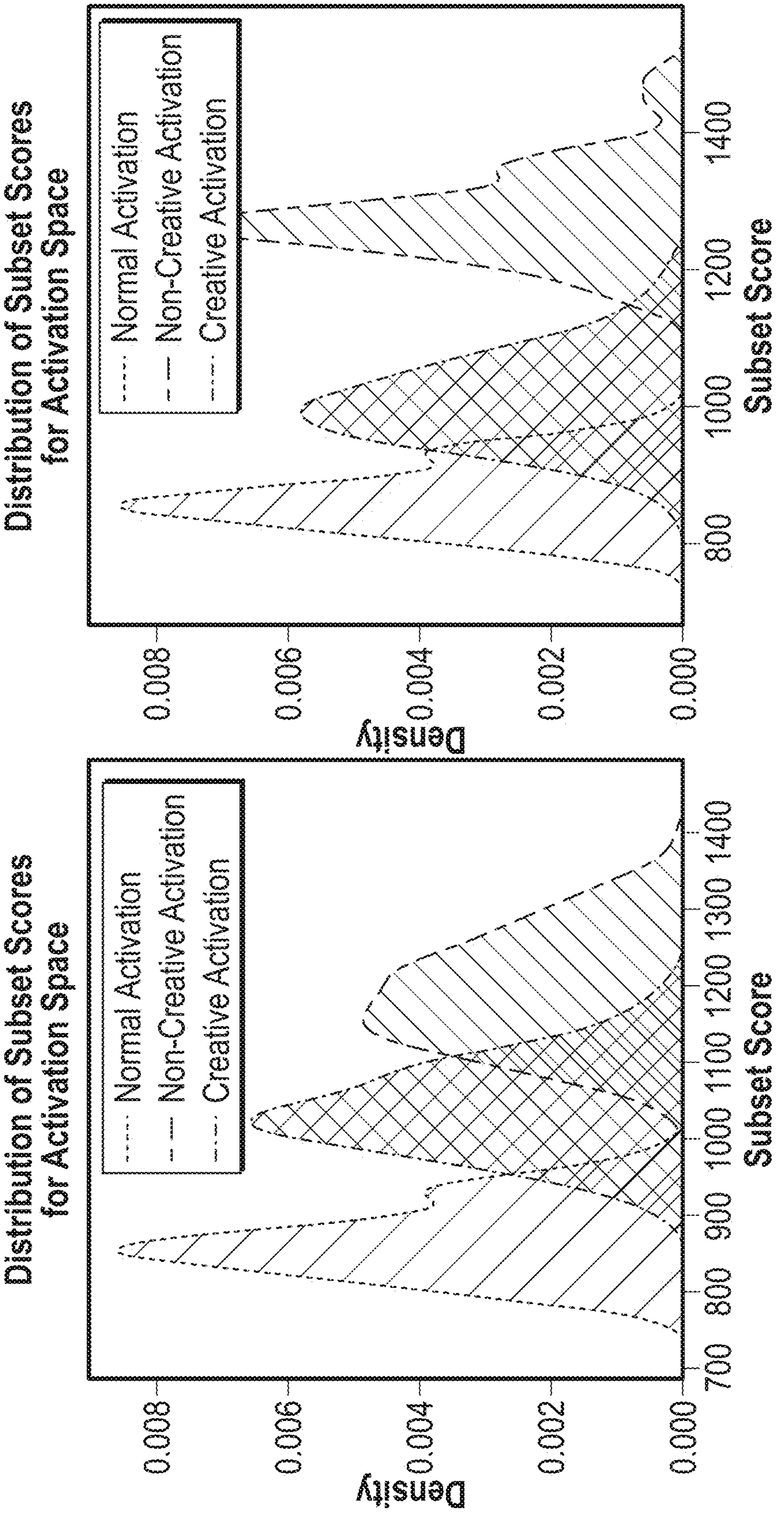
FIG. 3 illustrates graphs of example subset scores distributions in the activation space of a creative decoder, in accordance with an example embodiment.

FIG. 1 illustrates graphs of example subset scores distributions in the activation space of a creative decoder, in accordance with an example embodiment. Subset scores for different proportions of creative samples in the activation space are shown, including 90-10 (left-side of FIG. 3) and 50-50 (right-side of FIG. 3). Subset scores distribution across layers of a Creative Decoder C(x) with Berk-Jones (BJ) score function for normal, creative and non-creative samples (the skilled artisan will be familiar with the BJ score function, which is a particular scoring function to measure divergence between two distributions). The distributions of FIG. 3 help identify which samples are creative, which samples are non-creative, and which samples are regular (normal) samples. The distributions of subset scanning scores are shown for normal images (expected distribution; left-most distribution of each graph), for creative samples (middle distribution of each graph) and for non-creative samples (right-most distribution of each graph). If the distributions completely overlap, it would not be possible to determine if a sample was creative or not. Since each distribution stands separately (or with minimal overlap) from the other distributions, the type of scores that creative and non-creative samples have can be identified and characterized. Higher AUCs (area under the curve for the Receiver Operating Characteristic curve (AUCROC)) are expected when distributions are separated from each other and lower AUCs when they overlap. The characterization in FIG. 3 is used as an input of the multiple Gaussian Distributions that embed both human creative knowledge and the activations scores provided by an exemplary embodiment.

Estimating the Creativity Score

Figure 4A:
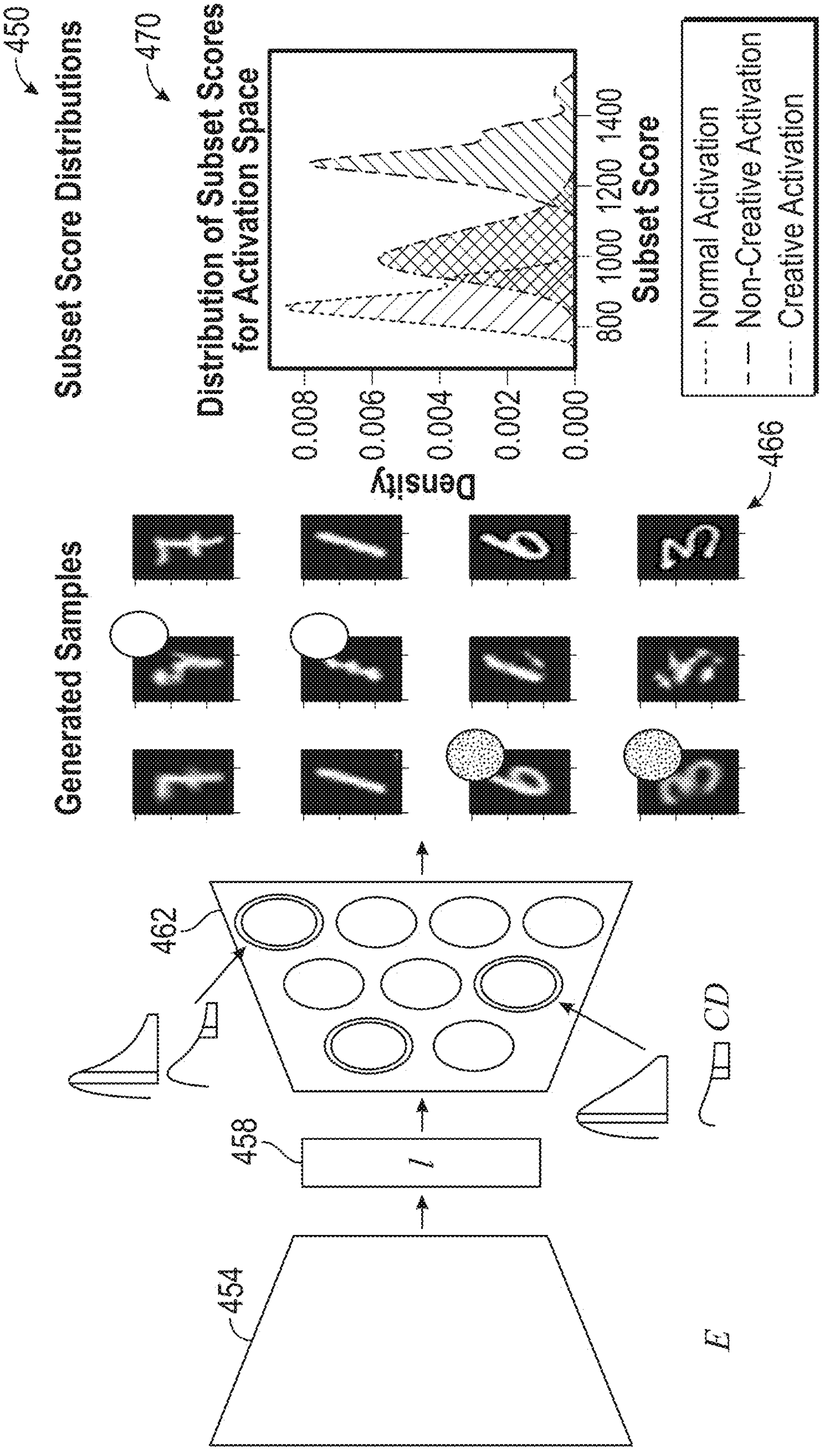
FIG. 4A illustrates an overview of an exemplary embodiment.

FIG. 4A illustrates an overview of an exemplary embodiment. The system scans over the activation layer of, for example, a creative decoder 462 to generate distributions of the samples that were processed by the creative decoder 462. The system then, for example, filters out only the samples that have been characterized as creative.

Initially, a model of an encoder 454 generates vector representations 458 that capture the relevant characteristics of the corresponding samples. The encoder 454 may be implemented using a VAE, a GAN, and the like. In one example embodiment, the encoder 454 is an off-the-shelf component running on a server, such as cloud computing node 10 (as described more fully below in conjunction with FIG. 8). In one example embodiment, if the samples and activation information are readily available (as a result, for example, of a previous encoding of the samples), the encoding operation may be skipped.

The distribution of the activation space of the creative decoder 462 is analyzed. (The decoder 512 may be implemented using a VAE, a GAN, a creative decoder (see co-assigned U.S. Patent Publication No. 2021-0287101), and the like.) After the activations are extracted from the model of the creative decoder 462 for the set of latent vectors 458, the empirical p-values are computed followed by the maximization of non-parametric scan statistics (NPSS). Finally, subset score distributions 470 for the creative and non-creative processes are estimated, and the corresponding anomalous subset of nodes of the creative decoder 462 are identified. The generated samples 466 are also identified as normal (neither creative nor non-creative), creative (identified by solid dots), and non-creative (identified by cross-hatched dots).

In one example embodiment, a plurality of scores are generated for each sample, where each score corresponds to a different layer of the encoder 504. In one example embodiment, a set of samples are grouped together and one or more scores are generated for the group. The scores generated for the group may include a score corresponding to each layer of the encoder 504.

Figures 4B, 5A:
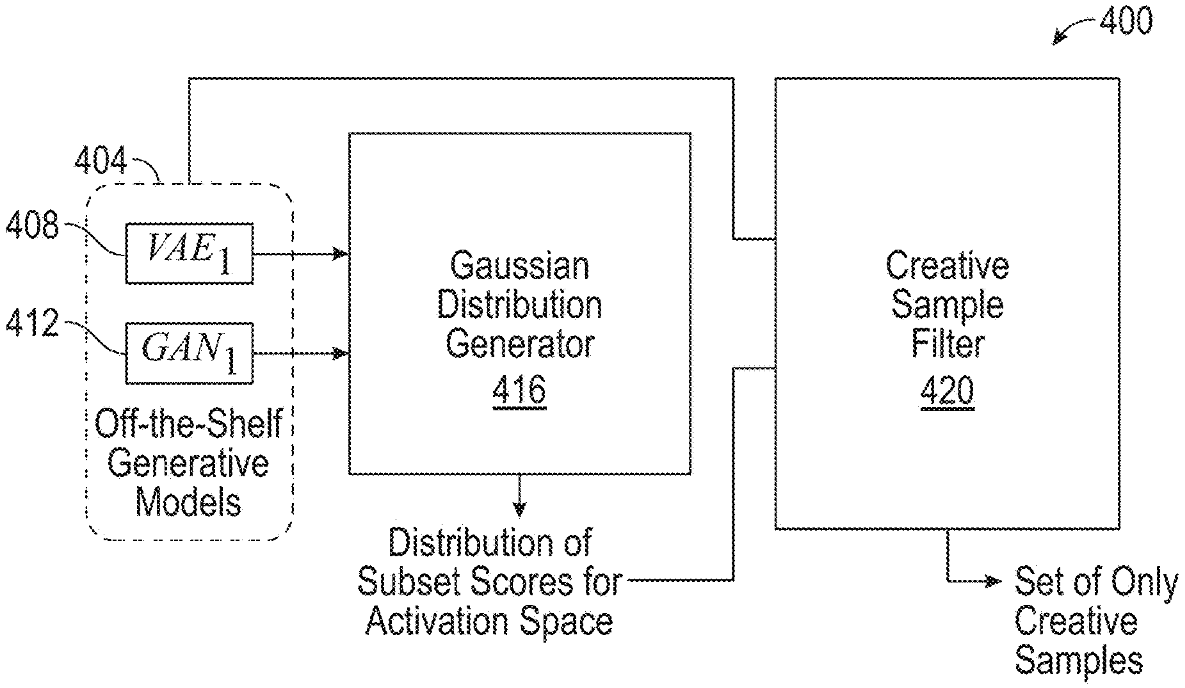
FIG. 4B is a block diagram of an example system, in accordance with an example embodiment.
FIG. 5A is a table illustrating Detection Power for group-based and individual subset scanning over pixel and activation space for a creative decoder, in accordance with an example embodiment.

FIG. 4B is a block diagram of an example system 400, in accordance with an example embodiment. In one example embodiment, a generative model 404 of the decoder 462 is provided to a Gaussian distribution generator 416 for training, as described more fully below in conjunction with FIG. 6. The generative models 404 of the decoder 462 may include any combination of a VAE 408, a GAN 412, a creative decoder (see above-mentioned co-assigned U.S. Patent Publication No. 2021-0287101), and the like and may be off-the-shelf components. The Gaussian distribution generator 416 generates a Gaussian model for generating the distributions based on, for example, one of the generative models 404. In one example embodiment, the Gaussian distribution generator 416 is implemented on a server or node, such as cloud computing node 10, using method 600 of FIG. 6.

A creative sample filter 420 utilizes the Gaussian model to characterize the samples as, for example, normal, creative, and non-creative based on the distribution of the subset scores. The creative sample filter 420 may be implemented using the method 700 of FIG. 7 running on a server, such as cloud computing node 10. In one example embodiment, the creative samples are transferred to a computer-aided design (CAD) and manufacturing system 424. The CAD and manufacturing system 424 may be used to create additional creative designs based on the transferred samples and the additional creative designs may be applied to a physical product. For example, the additional creative designs may be applied to a fabric that may be manufactured by the CAD and manufacturing system 424.

After the activations, as defined by the structure of the creative decoder, are extracted from the generative model 404 for the set of latent vectors 458 (operation 604 of FIG. 6), the empirical p-values are computed followed by the maximization of non-parametric scan statistics (NPSS) L to measure each activation (operation 608 of FIG. 6)). The proportion of creative throughput is estimated (operation 612 of FIG. 6). Distributions of subset scores for creative and non-creative processes are estimated, and a subset of samples and the corresponding anomalous subset of nodes in the creative decoder 462 are used to build a creative score based on multiple Gaussian Distributions (operation 616 of FIG. 6). A test is then performed to determine whether the creative score S is greater than a threshold t (decision block 620 of FIG. 6). If the creative score S is not greater than the threshold t, the proportion of creative throughput is estimated again such that a different percentage of creative output is used; otherwise, the trained Gaussian distributions are saved (operation 624 of FIG. 6). In one example embodiment, if the activations are not scored under $\theta_c$, the sample is discarded and not shown to the end-user (operations 720-724 discussed below).

In one example embodiment, three gaussian functions are learned by fitting the scores corresponding to normal, non-creative and creative samples to individual clusters (see, FIG. 5B) along with the human evaluated information. The parameters of the gaussian mixture may be learned using an iterative optimization technique such as expectation maximization and, thus, for a given sample, a creativity score is defined as a function of the probability of the sample belonging to the creative cluster.

Example Use Case

In one example embodiment, a user provides a small set of examples that illustrate what is novel and meaningful for a particular domain (e.g., drug discovery, architecture design, and the like). Consider the example of an architectural firm that uses a machine learning model to create house blueprints (where the firm wants to ensure that only blueprints that are creative, according to the standards of the firm, are used). In this example, the system takes the following as inputs: the generative model to create blueprints and a small set of examples. The system creates a creative metric for the given creative model, the generated samples, and the estimated throughput. The system trains an ML model (the Gaussian mixture model) using the creative distributions found in the activation space. The system runs the generative model, such as the original creative model (generally VAE, a creative decoder or a GAN), and the created sampling method and returns to the user only the samples that fall under the sampling method. The user only evaluates a subset of the samples (and not the whole throughput of the network). At this point, the samples can be used for further work or, after the user approves, included in the set of creative samples (providing soft labeling).

Group-Based Subset Scanning Over the Creative Decoder Activation Space

Subset scanning treats the creative quantification and characterization problem as a search for the most anomalous subset of observations in the data. This exponentially large search space is efficiently explored by exploiting mathematical properties of the disclosed measure of anomalousness. Consider a set of samples from the latent space $X=\{X_1 \ldots X_M\}$ and nodes $O=\{O_1 \ldots O_J\}$ within the creative decoder CD, such as creative decoder 462, where CD is a generative neural network capable of producing creative outputs. Let $X_S \subseteq X$ and $O_S \subseteq O$, the subsets S are then defined under consideration to be $S=X_S \times O_S$. The goal is to find the most anomalous subset:

$$S^* = \arg\max_S F(S) \quad (1)$$

where the score function F(S) defines the anomalousness of a subset of samples from the latent space and node activations. Group-based subset scanning uses an iterative ascent procedure that alternates between two steps: a step identifying the most anomalous subset of samples for a fixed subset of nodes, or a step that identifies the converse. There are $2^M$ possible subsets of samples, $X_S$, to consider at these steps. However, the Linear-time Subset Scanning property (LTSS) reduces this space to only M possible subsets while still guaranteeing that the highest scoring subset will be identified. This reduction in the search space is a key feature that enables subset scanning to scale to large networks and sets of samples.

Non-Parametric Scan Statistics (NPSS)

Group-based subset scanning uses NPSS that has been used in other pattern detection methods. Given that NPSS makes minimal assumptions on the underlying distribution of node activations, the disclosed approach has the ability to scan across different types of layers and activation functions. There are three steps to use non-parametric scan statistics on a model's activation data. The first is to form a distribution of "expected" activations at each node ($H_O$). This "expected" distribution is generated by letting the regular decoder process samples that are known to be from the training data (sometimes referred to as "normal" samples) and the activations are recorded at each node. The second step involves scoring a group of samples in a test set that may contain creative or normal artifacts. The activations induced by the group of test samples are recorded and they are compared to the baseline activations created in the first step. This comparison results in a p-value at each node, for each sample from the latent space in the test set. Lastly, the anomalousness of the resulting p-values are quantified by finding $X_S$ and $O_S$ that maximize the NPSS, which quantify how much an observed distribution of p-values deviates from the uniform distribution.

Let $$A_{zj}^{H_0}$$

be the matrix of activations from l latent vectors from training samples at each of J nodes in a creative decoder layer. Let $A_{ij}$ be the matrix of activations induced by M latent vectors in the test set, that may or may not be novel. Group-based subset scanning computes an empirical p-value for each $A_{ij}$, as a measurement for how anomalous the activation value of a potentially novel sample $X_i$ is at node $O_j$. This p-value $p_{ij}$ is the proportion of activations from the Z background samples, $$A_{zj}^{H_0},$$

that are larger or equal to the activation from an evaluation sample at node $O_j$.

$$p_{ij} = \frac{1 + \sum_{z=1}^{|Z|} I\left(A_{zj}^{H_0} \geq A_{ij}\right)}{|Z| + 1} \tag{2}$$

where I(·) is the indicator function. A shift is added to the numerator and denominator so that a test activation that is larger than all activations from the background at that node is given a non-zero p-value. Any test activation smaller than or tied with the smallest background activation at that node is given a p-value of 1.0.

Group-based subset scanning processes the matrix of p-values (P) from test samples with an NPSS to identify a submatrix $S=X_S \times O_S$ that maximizes F(S), as this is the subset with the most statistical evidence for having been affected by an anomalous pattern. The general form of the NPSS score function is $$F(S) = \max_\alpha F_\alpha(S) = \max_\alpha \phi(\alpha, N_\alpha(S), N(S)) \tag{3}$$

where N(S) is the number of empirical p-values contained in subset S and $N_\alpha(S)$ is the number of p-values less than (significance level) a contained in subset S. It has been shown that for a subset S consisting of N(S) empirical p-values, $E[N_\alpha(S)]=N(S)\alpha$. Group-based subset scanning attempts to find the subset S that shows the most evidence of an observed significance higher than an expected significance, $N_\alpha(S)>N(S)\alpha$, for some significance level $\alpha$.

The Berk-Jones (BJ) test statistic was used as the scan statistic. The BJ test statistic is defined as:

$$\phi_{BJ}(\alpha, N_\alpha, N) = N * KL\left(\frac{N_\alpha}{N}, \alpha\right) \tag{4}$$

where KL refers to the Kullback-Liebler divergence, $$KL(x, y) = x \log\frac{x}{y} + (1 - x)\log\frac{1 - x}{1 - y},$$

between the observed and expected proportions of significant p-values. BJ can be interpreted as the log-likelihood ratio for testing whether the p-values are uniformly distributed on [0, 1].

Experimental Setup and Results

It is hypothesized that creative content leaves a subtle but systematic trace in the activation space that can be identified by looking across multiple creative samples. Further, it is assumed that not all generative models will have the same throughput of creative samples in a batch. Thus, exemplary embodiment(s) should be evaluated under different proportions to see if even models that generate a small percentage of creative samples can be detected thereby. This hypothesis was tested through group-based subset scanning over the activation space that encodes groups of samples that may appear anomalous when analyzed together. The disclosed approach is applied to the creative decoder 462 and both the pixel/input and activation space are scanned. Image datasets with multiple examples of clothing and other everyday objects were used. Detection power, that is the method's ability to distinguish between test sets that contain some proportion of creative samples and test sets containing only normal content, was quantified using AUC.

Datasets and Creative Labeling

For human evaluation, 9 evaluators annotated a pool of 500 samples per dataset (agreement amongst>3 annotators was used as consensus), generated from either using the creative decoder 462, and regular decoding. Four labels, 'not novel or creative (similar to training data)', 'novel but not creative (different from training data but does not seem meaningful or useful)', 'creative (different from training data and is meaningful or useful)', and 'inconclusive' were used.

Subset Scanning Setup

Individual and group-based scanning were run on node activations extracted from the creative decoder 462. Group-based scanning was tested across several proportions of creative content in a group, ranging from 10% to 50%. Z=250 latent vectors were used to obtain the background activation distribution ($A^{H_0}$) for experiments with both datasets. For evaluation, each test set had samples that were drawn from a set of 100 normal samples from the regular decoder (separate from Z) and 100 samples labeled as creative and 100 non-creative samples (not novel or creative label).

FIG. 5A is a table illustrating Detection Power (AUC) for group-based and individual subset scanning over pixel and activation space for the creative decoder 462, in accordance with an example embodiment.

Figure 5B:
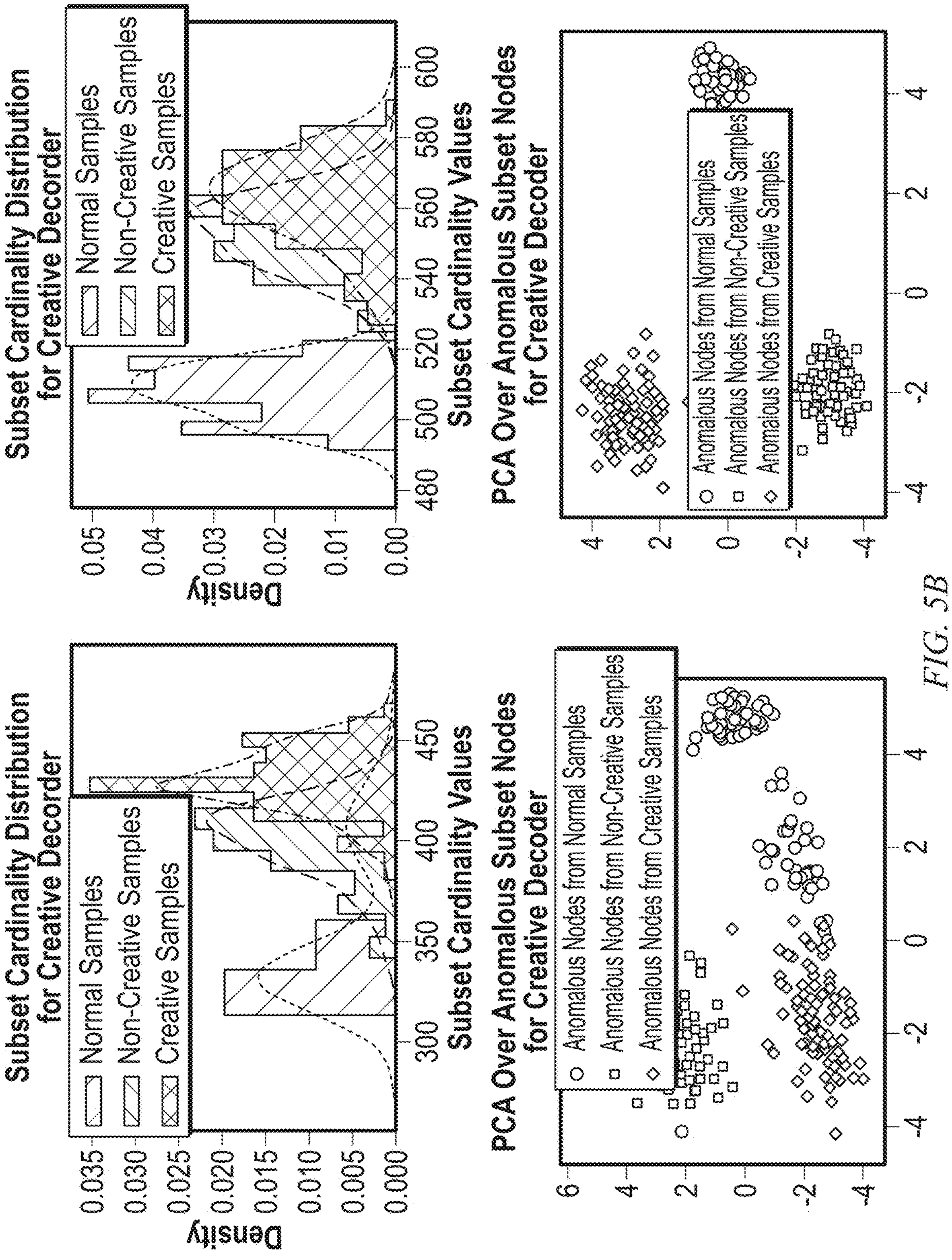
FIG. 5B illustrate representations of activations characterization, in accordance with an example embodiment.

FIG. 5B illustrates representations of activations characterization, in accordance with an example embodiment: (top) Subset Cardinality distributions for anomalous subsets for different types of generated samples and (bottom) PCA (principal component analysis) over anomalous subset nodes for the creative decoder activations under generation of normal, non-creative and creative samples.

Conducted experiments on original, typically decoded, and "creatively decoded" image datasets reveal that the proposed subset scores distribution is useful for detecting creative processes in the activation space rather than the pixel space. Further, it was found that creative samples generate larger subsets of anomalies than normal or non-creative samples across datasets. Also, the node activations highlighted during the creative decoding process are different from those responsible for normal sample generation.

Results

In FIG. 5A, results showing the creative detection capabilities of both activation and pixel spaces were presented. It is seen that the characterization improves when detecting the creative samples in the activation space, than when scanning is performed over the pixel space. Additionally, in FIG. 5B, for both datasets, a larger extent of anomalous nodes is observed during creative generation compared to normal and non-creative. This observation is consistent with the basic principle of the creative decoding process. To further inspect the activations, the principal component projections of the anomalous subset of nodes is visualized for different sets of samples. As can be seen, the activations for different types of samples are distinctive. Notably, some overlap for normal and creative samples is noticed. Based on this observation, it is hypothesized that, as more complex datasets are subject to creative decoding, appearance of more overlapping nodes will be observed.

One or more embodiments for creativity detection in machine-generated images thus work by analyzing the activation space for an off-the-shelf decoder. Both the subset of the input samples identified as creative, and the corresponding nodes in the network's activations that identified those samples as creative, are provided. Additionally, larger datasets and other generative models are tested across to understand how the human perception of creativity can be captured under more complex domains. The final goal is to use this creativity quantification approach as a control for more efficient generation of artifacts that are consistent with the human perception of creativity.

Figure 6:
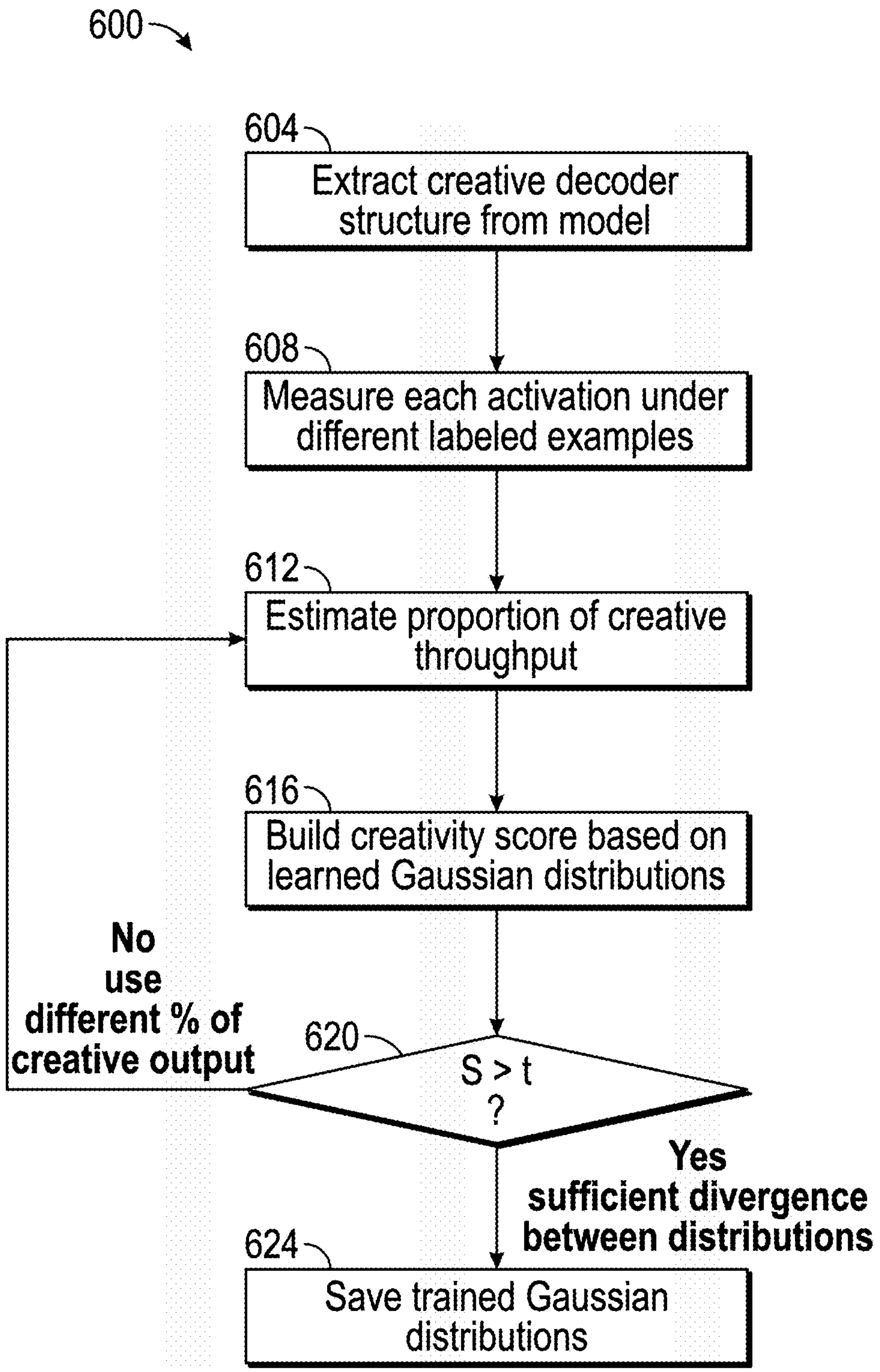
FIG. 6 is a flowchart of an example method for generating trained Gaussian Distributions, in accordance with an example embodiment.

FIG. 6 is a flowchart of an example method 600 for generating trained Gaussian Distributions, in accordance with an example embodiment. In one example embodiment, a creative decoder structure is extracted from a generative model (operation 604). In general, the vector sample input is passed over the creative decoder 462 and the output activations for each layer are extracted. In other words, for each layer, the matrix (weights) for the representation of the corresponding sample is derived and saved. Each activation is measured under different labeled examples (operation 608). The measurement of the activations is performed, for example, using a BJ scoring function and NPSS. In one example embodiment, this measurement, along with the Gaussian model training, is performed in the cloud on a server (see, e.g., cloud computing node 10), optionally with multiple cores, and the like.

The proportion of creative throughput is estimated (operation 612) and a creativity score is built based on learned Gaussian Distributions (operation 616). In one example embodiment, scanning is evaluated with the assumption that half of the samples under consideration are creative. Conventionally, the creativity models have metrics, such as scores, indicating how well the creativity models perform at generating creativity value. The metrics are used to estimate, for example, the percentage of samples generated by the creativity models that are creative, these proportions help to refine the sampling capabilities in one or more exemplary embodiments. A check is performed to determine if the creativity score is greater than t (decision block 620). If the creativity score is not greater than t (NO branch of operation 620), the method 600 proceeds with operation 612; otherwise (YES branch of operation 620), the trained Gaussian Distribution is saved (operation 624). It is noted that logic to implement the flow chart operations/steps can be found, for example, in the text discussion herein corresponding to the discussion of method 600 and corresponding equations can be solved using known techniques implemented in high-level code, that is compiled and/or interpreted into machine-executable code. In one example embodiment, operations 604-612 are performed on a plurality of graphical processing units (GPUs). The remaining operations of the method 600 may be processed on the graphical processing units, the cloud, a local notebook, mobile devices (tablets or smartphones), and the like.

Figure 7:
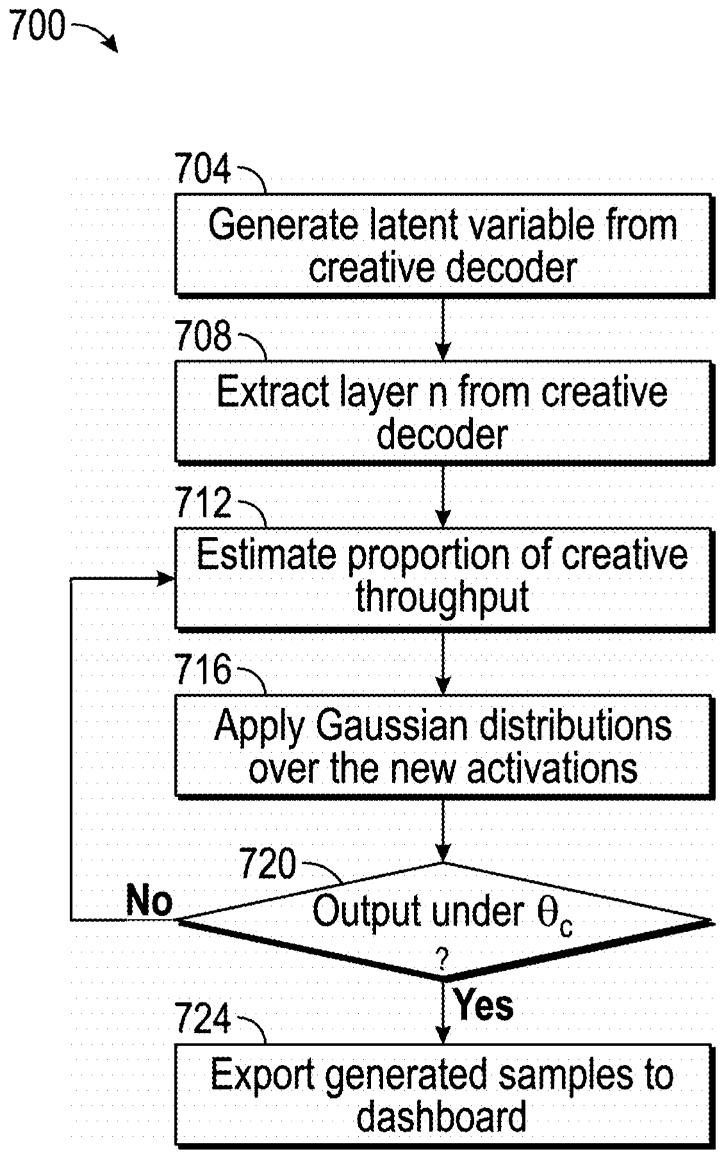
FIG. 7 is a flowchart of an example method for generating creative samples, in accordance with an example embodiment.

FIG. 7 is a flowchart of an example method 700 for generating creative samples, in accordance with an example embodiment. In one example embodiment, a latent variable is generated from the creative decoder 462 (operation 704) and a layer n is extracted from the creative decoder 462 (operation 708). Note, in a non-limiting example, this process is carried on the server side using, for example, multiple GPUs. This is similar to extracting the activations in operation 604, but the model is processed using a random input vector (not a known sample) to generate a new sample (and only a single layer is considered). As above, for each layer, the matrix (weights) for the representation of the random input vector is derived and saved. A proportion of creative throughput is estimated using the model trained with method 600 (operation 712). In one example embodiment, operations 704-712 of the method 700 may be processed on graphical processing units, the cloud, a local notebook, mobile devices (tablets or smartphones), and the like. Gaussian Distributions are applied over the new activations (operation 716). This aspect employs matrix multiplication where a latent variable is passed through the creative decoder 462 and, the resulting value is applied to the Gaussian distribution to determine in which of the three distributions the sample falls. Note that after the Gaussian model is trained, the solution can run, for example, in the cloud, in local notebooks, or mobile devices. A check is performed to determine if the output is less than $\theta_c$ (decision block 720). If the output is not less than $\theta_c$ (NO branch of decision block 720), the method 700 proceeds with operation 712; otherwise (YES branch of decision block 720), the generated samples are exported to a dashboard (operation 724). Operations 716-724 may be processed on the cloud, a local notebook, mobile devices (tablets or smartphones), and the like.

In one example embodiment, the samples are architectural samples, such as floor plans of residential properties. The samples are processed to filter out those samples that have been characterized as creative and the creative samples are, for example, transferred to a computer-aided design (CAD) device for architectural tasks where they may be stored, modified and/or utilized to create additional creative architectural designs.

In one example embodiment, the samples are medicinal samples, such as medicinal formulas. The samples are processed to filter out those samples that have been characterized as creative and the creative samples are, for example, transferred to a system for simulating and manufacturing medicinal products, where they may be stored, modified and/or utilized to create additional creative medicines and manufacture medications. In one example embodiment, the samples are fabric and/or fashion samples. The samples are processed to filter out those samples that have been characterized as creative and the creative samples are, for example, transferred to a system for designing and/or manufacturing new fabrics and fashions, where they may be stored, modified and/or utilized to create, for example, new creative fabric designs and to manufacture new creative fabrics using a manufacturing system.

Given the discussion thus far, it will be appreciated that, in general terms, an exemplary method, according to an aspect of the invention, includes the operations of initializing, using at least one processor, a gaussian distribution with random parameters for each of creative scores, non-creative scores, and normal scores; updating, using the at least one processor, the random parameters to maximize a likelihood of each sample score from a training set being from its corresponding gaussian distribution by using one or more gaussian mixture models with expectation maximization to cluster the creative scores, the non-creative scores, and the normal scores (operations 604-624); estimating, using the at least one processor, a creativity score for each of a plurality of given samples as a probability of the corresponding given sample being in a creative cluster given one or more of the random parameters of the corresponding gaussian distribution (operations 704-720); and filtering 420, using the at least one processor, one or more of the plurality of samples based on the creativity scores to generate a set of optimal samples exhibiting creativity (operation 724).

In one aspect, an apparatus comprising a memory and at least one processor, coupled to the memory, and operative to perform operations comprising initializing a gaussian distribution with random parameters for each of creative scores, non-creative scores, and normal scores; updating the random parameters to maximize a likelihood of each sample score from a training set being from its corresponding gaussian distribution by using one or more gaussian mixture models with expectation maximization to cluster the creative scores, the non-creative scores, and the normal scores (operations 604-624); estimating a creativity score for each of a plurality of given samples as a probability of the corresponding given sample being in a creative cluster given one or more of the random parameters of the corresponding gaussian distribution (operations 704-720); and filtering 420 one or more of the plurality of samples based on the creativity scores to generate a set of optimal samples (operation 724).

In one aspect, a computer program product for federated learning, the computer program product comprising a computer readable storage medium having program instructions embodied therewith, the program instructions executable by a computer to cause the computer to perform operations comprising initializing a gaussian distribution with random parameters for each of creative scores, non-creative scores, and normal scores; updating the random parameters to maximize a likelihood of each sample score from a training set being from its corresponding gaussian distribution by using one or more gaussian mixture models with expectation maximization to cluster the creative scores, the non-creative scores, and the normal scores (operations 604-624); estimating a creativity score for each of a plurality of given samples as a probability of the corresponding given sample being in a creative cluster given one or more of the random parameters of the corresponding gaussian distribution (operations 704-720); and filtering 420 one or more of the plurality of samples based on the creativity scores to generate a set of optimal samples (operation 724).

In one example embodiment, the estimating the creativity score is based on a distance metric between a subset scores distribution 470 in an activation space and a pixel space across a set of samples; and the filtering 420 further comprises applying the distance metric to select one or more of the samples that are characterized by a higher probability of being creative.

In one example embodiment, the estimating the creativity score further comprises analyzing a distribution of an activation space of a generative model 404 under normal samples.

In one example embodiment, the training set is a set of samples related to a physical product and the method further comprises transferring the optimal samples to a computer-aided design (CAD) device 424; creating additional creative designs based on the optimal samples; and applying the additional creative designs to a physical product.

In one example embodiment, the training set is a set of fabric design samples, and the method further comprises transferring the optimal samples to a computer-aided design (CAD) and fabric manufacturing system 424; and manufacturing fabric based on the optimal samples.

In one example embodiment, the estimating the creativity score further comprises extracting activations from a creative decoder 462 or generative adversarial network (GAN) for a set of latent vectors l; computing empirical p-values; computing a maximization of non-parametric scan statistics (NPSS); and estimating distributions of subset scores 470 for creative and non-creative processes; and wherein the estimation of the creative score is performed using a subset of samples and a corresponding anomalous subset of nodes in a network.

In one example embodiment, the filtering 420 further comprises discarding one of the given samples if activations are not scored under a threshold $\theta_c$.

In one example embodiment, the estimating distributions of subset scores further comprises learning a plurality of gaussian functions by fitting scores corresponding to normal, non-creative and creative samples to individual clusters in conjunction with human evaluated information.

In one example embodiment, parameters of a gaussian mixture are learned based on results of the estimating the distributions of the subset scores and using an iterative optimization technique.

In one example embodiment, the iterative optimization technique is expectation maximization and, for a given sample, the creativity score is defined as a function of the probability of the given sample belonging to the creative cluster.

In one example embodiment, the anomalous subset of nodes and the subset scanning scores are provided to improve an explainability capability of the distance metric generated score of current variational autoencoders 404.

In one example embodiment, the initializing the gaussian distribution further comprises scanning a group-based subset using an iterative ascent procedure that alternates between a step of identifying a most anomalous subset of samples for a fixed subset of nodes and a step that identifies the converse.

In one or more embodiments, creative designs are embodied in physical products; many different physical products can be creatively designed (and then built/manufactured), such as a fabric, a house, an office building, a drug, and the like.

Figure 8:
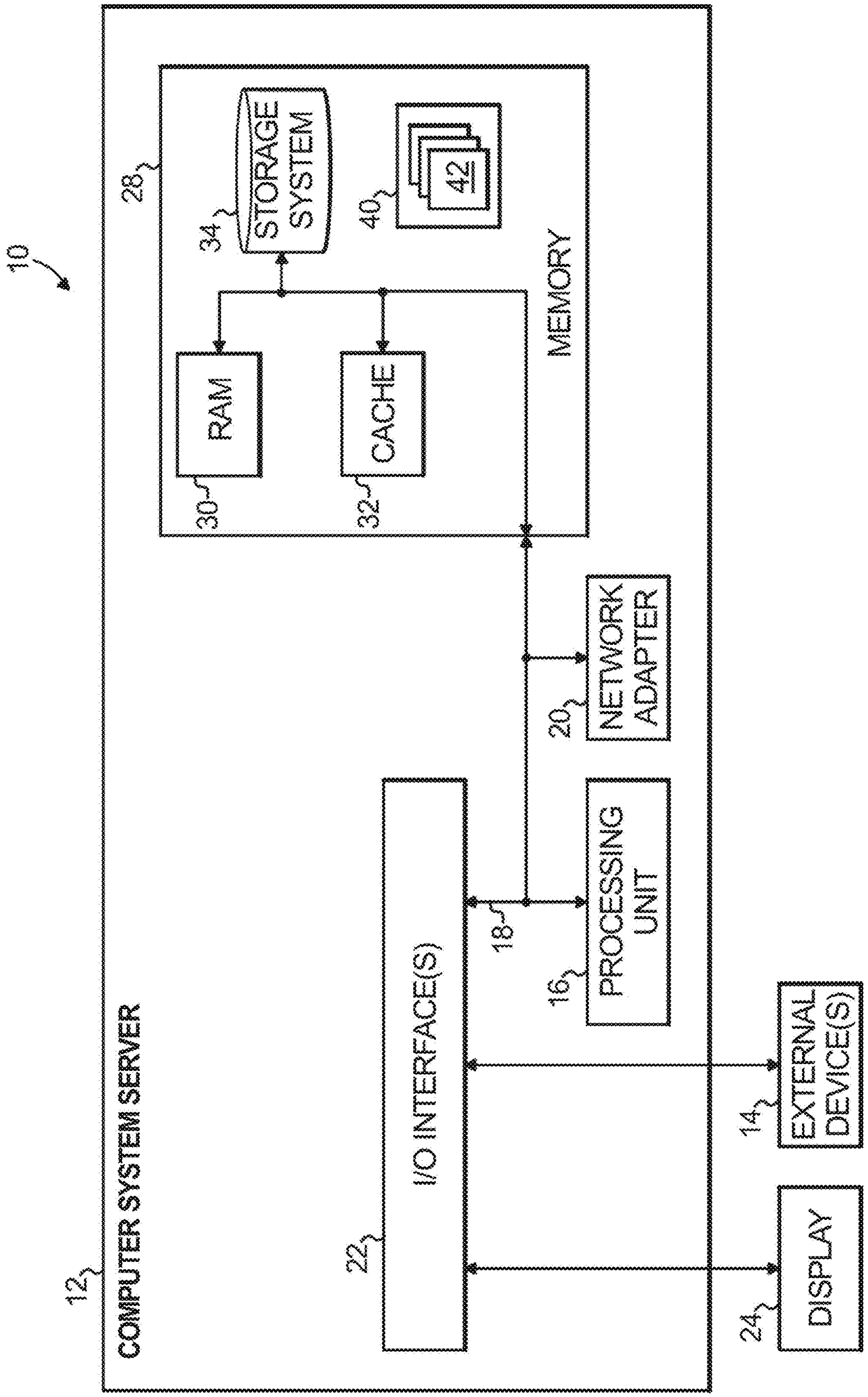
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

initializing, using at least one processor, a first gaussian distribution with random parameters for creative scores, a second gaussian distribution with random parameters for non-creative scores, and a third gaussian distribution with random parameters for normal scores;

updating, using the at least one processor, the random parameters from each of the first gaussian distribution, the second gaussian distribution, and the third gaussian distribution to maximize a likelihood of each sample score from a labeled training set being from a corresponding one of the first gaussian distribution, the second gaussian distribution, and the third gaussian distribution, wherein the random parameters are updated by using one or more gaussian mixture models with expectation maximization to cluster the creative scores, the non-creative scores, and the normal scores, wherein the sample score represents node activations in an activation space of a generative machine learning model when the generative machine learning model generated a corresponding sample of the labeled training set, and wherein the updating trains the one or more gaussian mixture models to produce trained one or more gaussian mixture models;

receiving new output samples from the generative machine learning model and a corresponding subset of node activations that were used by the generative machine learning model to generate the new output samples;

estimating, using the trained one or more gaussian mixture models, creativity scores for each of the new output samples as a probability of a corresponding new output sample being in a creative cluster that corresponds to the first gaussian distribution with the updated random parameters, wherein the estimating uses the corresponding subset of node activations as input into the trained one or more gaussian mixture models, and wherein the creativity scores are based on a distance metric between a distribution of scores for the corresponding subset of node activations; and filtering, using the at least one processor, one or more of the new output samples based on a corresponding one of the creativity scores to generate a set of optimal samples exhibiting creativity.

2. The computer-implemented method of claim 1, wherein each sample is a fabric sample and each sample score is a fabric sample score.

3. The computer-implemented method of claim 1, wherein the filtering further comprises applying the distance metric to select the one or more of the new output samples that are characterized by a higher probability of being creative.

4. The computer-implemented method of claim 1, wherein the estimating of the creativity scores further comprises analyzing a distribution of the activation space of a generative model under normal samples.

5. The computer-implemented method of claim 1, wherein the labeled training set is a set of samples related to a physical product, and the computer-implemented method further comprises:

controlling a computer-aided design (CAD) device to create additional creative designs based on the generated set of optimal samples.

6. The computer-implemented method of claim 1, wherein the labeled training set is a set of fabric design samples and the computer-implemented method further comprises:

transferring the set of optimal samples to a CAD and fabric manufacturing system; and manufacturing fabric based on the set of optimal samples.

7. The computer-implemented method of claim 1, wherein the estimating of the creativity scores further comprises:

extracting activations from a creative decoder or generative adversarial network (GAN) for a set of latent vectors l;

computing empirical p-values;

computing a maximization of non-parametric scan statistics (NPSS); and estimating distributions of subset scores for creative and non-creative processes, and the estimation of the creativity scores is performed using a subset of samples and a corresponding anomalous subset of nodes in a network.

8. The computer-implemented method of claim 7, wherein the filtering further comprises discarding one of the new output samples from the one or more of the new output samples if the activations are not scored under a threshold $\theta_c$.

9. The computer-implemented method of claim 7, wherein the estimating of the distributions of the subset scores further comprises learning a plurality of gaussian functions by fitting scores corresponding to normal, non-creative, and creative samples to individual clusters in conjunction with human evaluated information.

10. The computer-implemented method of claim 9, further comprising learning parameters of a gaussian mixture based on results of the estimating of the distributions of the subset scores and using an iterative optimization technique.

11. The computer-implemented method of claim 10, wherein the iterative optimization technique is the expectation maximization, and, for a given sample, the creativity scores are defined as a function of the probability of the given sample belonging to the creative cluster.

12. The computer-implemented method of claim 7, further comprising providing the corresponding anomalous subset of nodes and subset scanning scores to improve an explainability capability of a distance metric generated score of current variational autoencoders.

13. The computer-implemented method of claim 7, wherein the initializing the first gaussian distribution, the second gaussian distribution, and the third gaussian distribution further comprises scanning a group-based subset using an iterative ascent procedure that alternates between a step of identifying a most anomalous subset of samples for a fixed subset of nodes, and a step that identifies a converse.

14. An apparatus, comprising:

a memory; and at least one processor, coupled to said memory, and operative to perform operations comprising:

initializing a first gaussian distribution with random parameters for creative scores, a second gaussian distribution with random parameters for non-creative scores, and a third gaussian distribution with random parameters for normal scores;

updating the random parameters from each of the first gaussian distribution, the second gaussian distribution, and the third gaussian distribution to maximize a likelihood of each sample score from a labeled training set being from a corresponding one of the first gaussian distribution, the second gaussian distribution, and the third gaussian distribution, wherein the random parameters are updated by using one or more gaussian mixture models with expectation maximization to cluster the creative scores, the non-creative scores, and the normal scores, wherein the sample score represents node activations in an activation space of a generative machine learning model when the generative machine learning model generated a corresponding sample of the labeled training set, and wherein the updating trains the one or more gaussian mixture models to produce trained one or more gaussian mixture models;

receiving new output samples from the generative machine learning model and a corresponding subset of node activations that were used by the generative machine learning model to generate the new output samples;

estimating, using the trained one or more gaussian mixture models, creativity scores for each of the new output samples as a probability of a corresponding new output sample being in a creative cluster that corresponds to the first gaussian distribution with the updated random parameters, wherein the estimating uses the corresponding subset of node activations as input into the trained one or more gaussian mixture models, and wherein the creativity scores are based on a distance metric between a distribution of scores for the corresponding subset of node activations; and filtering one or more of the new output samples based on a corresponding one of the creativity scores to generate a set of optimal samples exhibiting creativity.

15. The apparatus of claim 14, wherein the filtering further comprises applying the distance metric to select the one or more of the new output samples that are characterized by a higher probability of being creative.

16. The apparatus of claim 14, wherein the estimating of the creativity scores further comprises:

extracting activations from a creative decoder or generative adversarial network (GAN) for a set of latent vectors l;

computing empirical p-values;

computing a maximization of non-parametric scan statistics (NPSS); and estimating distributions of subset scores for creative and non-creative processes, and the estimation of the creativity scores is performed using a subset of samples and a corresponding anomalous subset of nodes in a network.

17. The apparatus of claim 16, the operations further comprising learning parameters of a gaussian mixture based on results of the estimating of the distributions of the subset scores and using an iterative optimization technique.

18. The apparatus of claim 16, wherein the initializing the first gaussian distribution, the second gaussian distribution, and the third gaussian distribution comprises scanning a group-based subset using an iterative ascent procedure that alternates between a step of identifying a most anomalous subset of samples for a fixed subset of nodes, and a step that identifies a converse.

19. A computer program product for generating creativity metrics, the computer program product comprising a computer readable storage medium having program instructions embodied therewith, the program instructions executable by a computer to cause the computer to perform operations comprising:

initializing a first gaussian distribution with random parameters for creative scores, a second gaussian distribution with random parameters for non-creative scores, and a third gaussian distribution with random parameters for normal scores;

updating the random parameters from each of the first gaussian distribution, the second gaussian distribution, and the third gaussian distribution to maximize a likelihood of each sample score from a labeled training set being from a corresponding one of the first gaussian distribution, the second gaussian distribution, and the third gaussian distribution, wherein the random parameters are updated by using one or more gaussian mixture models with expectation maximization to cluster the creative scores, the non-creative scores, and the normal scores, wherein the sample score represents node activations in an activation space of a generative machine learning model when the generative machine learning model generated a corresponding sample of the labeled training set, and wherein the updating trains the one or more gaussian mixture models to produce trained one or more gaussian mixture models;

receiving new output samples from the generative machine learning model and corresponding subset of node activations that were used by the generative machine learning model to generate the new output samples;

estimating, using the trained one or more gaussian mixture models, creativity scores for each of the new output samples as a probability of a corresponding new output sample being in a creative cluster that corresponds to the first gaussian distribution with the updated random parameters, wherein the estimating uses the corresponding subset of node activations as input into the trained one or more gaussian mixture models, and wherein the creativity scores are based on a distance metric between a distribution of scores for the corresponding subset of node activations; and filtering one or more of the new output samples based on a corresponding one of the creativity scores to generate a set of optimal samples exhibiting creativity.

20. The computer program product of claim 19, wherein the filtering further comprises applying the distance metric to select the one or more of the new output samples that are characterized by a higher probability of being creative.

21. The computer program product of claim 19, wherein the estimating of the creativity scores further comprises:

extracting activations from a creative decoder or generative adversarial network (GAN) for a set of latent vectors l;

computing empirical p-values;

computing a maximization of non-parametric scan statistics (NPSS); and estimating distributions of subset scores for creative and non-creative processes, and the estimation of the creativity scores is performed using a subset of samples and a corresponding anomalous subset of nodes in a network.

* * * * *